(12) United States Patent
Arai

(10) Patent No.: US 6,339,484 B1
(45) Date of Patent: Jan. 15, 2002

(54) GUIDE PLATE ASSEMBLY AND IMAGE RECORDING MEDIUM TRANSPORTING APPARATUS USING THE ASSEMBLY

(75) Inventor: Haruhiko Arai, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/193,841

(22) Filed: Nov. 18, 1998

(30) Foreign Application Priority Data

Nov. 20, 1997 (JP) .............................................. 9-319463
Oct. 29, 1998 (JP) ........................................... 10-308251

(51) Int. Cl.⁷ ................................................ H04N 1/04
(52) U.S. Cl. ...................................... 358/498; 101/493
(58) Field of Search ................................. 430/303, 306, 430/301, 309; 358/498; 101/300, 307, 316

(56) References Cited

U.S. PATENT DOCUMENTS

| | | | | |
|---|---|---|---|---|
| 4,481,282 A | * | 11/1984 | Obata ......................... | 430/303 |
| 5,302,438 A | * | 4/1994 | Komamura ................. | 428/195 |
| 5,832,831 A | * | 11/1998 | Boyle ......................... | 101/375 |
| 5,894,799 A | * | 4/1999 | Bart ............................ | 101/376 |
| 6,072,976 A | * | 6/2000 | Kuriyama ................... | 399/302 |
| 6,090,529 A | * | 7/2000 | Gelbart ....................... | 430/306 |

* cited by examiner

Primary Examiner—Jerome Grant, II
(74) Attorney, Agent, or Firm—Sughrue Mion, PLLC

(57) ABSTRACT

There are provided a guide plate assembly in which at least a portion of a surface of the guide plate assembly opposite to an image forming surface of an image recording medium comprises a matrix layer, a cushion layer formed on the matrix layer to absorb impact and a resin layer made of a low frictional resin that is formed on the cushion layer, as well as an image recording medium transporting device to transport the image recording medium through a specified transport pathway, which comprises the guide plate assembly and transport roller pairs to transport the image recording medium through the transport pathway. A recording medium having an image forming surface can be guided and transported without flaw, in an image recording apparatus, an image reader and a developing device performing various image reproduction processing including exposure, recording, development and reading. Consequently, high-quality images without flaw can be obtained.

14 Claims, 4 Drawing Sheets

GUIDE PLATE ASSEMBLY AND IMAGE RECORDING MEDIUM TRANSPORTING APPARATUS USING THE ASSEMBLY

BACKGROUND OF THE INVENTION

This invention relates to the technical field of a guide plate assembly used to transport image recording media including a light-sensitive material having an image forming surface, in image recording apparatus, especially ones performing digital image recording with digital image signals, image readers including a scanner and processors (light-sensitive material processors) including a developing device, as well as an image recording medium transporting device using the guide plate assembly.

Heretofore, the image recorded on photographic films such as negatives and reversals (which are hereunder referred to simply as "films") has been commonly printed on light-sensitive materials such as photographic paper by means of direct (analog) exposure, in which projected light from the film is allowed to be incident on the light-sensitive material to achieve its real exposure.

A new technology has recently been introduced and this is a printer that relies upon digital exposure. Briefly, the image recorded on a film is read photoelectrically, converted to a digital signal and subjected to various image processing operations to produce image data for recording purposes; recording light that has been modulated in accordance with the image data is used to scan and expose a light-sensitive material to record a latent image, which is subsequently developed and output as a print (photograph). The printer operating on this principle has been commercialized as a digital photoprinter.

In the digital photoprinter, the image on a film is read photoelectrically and gradation correction and other operations are performed by subsequent image (signal) processing to determine exposing conditions. Hence, the digital photoprinter has many capabilities in image processing such as editing of printed images by, for example, assembling a plurality of images or splitting a single image into plural images, as well as color/density adjustment and edge enhancement; as a result, freely processed prints can be output depending on their use. In addition, the data on a printed image can be supplied into a computer or the like and stored in recording media such as a floppy disk or a hard disk.

A further advantage of the digital photoprinter is that compared to the prints produced by the conventional method of direct exposure, those which are output by the digital photoprinter have better image quality in such aspects as dispersive power and color/density reproduction.

Having these features, the digital photoprinter is basically composed of an input machine having a scanner (image reader) and an image processor and an output machine having both an exposing device and a developing device.

In the scanner, a reading light issued from a light source is incident on a film. The resulting projected light carrying an image recorded on the film is converted photoelectrically with an imaging lens in an image sensor such as a CCD sensor to read the image. The image is sent to the image processor as data for the image on the film (i.e., the image data signal). In the image processor, the image data from the scanner are subjected to specified image processing operations and the resulting output image data for image recording (i.e., exposing conditions) are sent to the exposing device.

In the exposing device, if it is of a type that relies upon exposure by scanning with an optical beam, the latter is modulated in accordance with the image data from the image processor and deflected in a main scanning direction as the light-sensitive material (photographic paper) is transported in an auxiliary scanning direction perpendicular to the main scanning direction, whereby a latent image is formed as the result of scan exposure of the light-sensitive material with the optical beam. Then, back printing is performed. In the developing device (light-sensitive material processor), the exposed light-sensitive material is subjected to development and other specified processing operations so as to output a print which reproduces the image that has been recorded on the film.

In the exposing device, whether it is in the digital photoprinter or an analog photoprinter that relies upon conventional "direct" exposure, a virgin light-sensitive material is in the form of a magazine, i.e., a roll contained in a light-proof case. The light-sensitive material is withdrawn out of the magazine loaded in the exposing device and further transported for exposure and other necessary steps. In the conventional digital or analog photoprinters, the light-sensitive material being transported is not cut but remains a web as it is subjected to exposure, back printing, development, rinse, drying and other necessary steps and only after these steps are complete, the light-sensitive material is cut to individual prints of a specified length.

In contrast, digital photoprinters also have a particular need to perform exposure after a web of light-sensitive material is cut to sheets of a length corresponding to one print or using a light-sensitive material previously cut, as accompanied by compactness of the apparatus and substantial reduction in the initial and running costs (printers of this type are hereinafter referred to as "image recording apparatus of a cut sheet type")

In the image recording apparatus of a cut sheet type, the light-sensitive material is nipped by transport roller pairs and transported by a light-sensitive material transporting device through a pathway that is formed in such a way that both top and bottom of the light-sensitive material are restrained by guide plates. In the aforementioned image recording apparatus of the type that performs all steps from exposure to development on a web of light-sensitive material, the latter can be transported with a reduced sliding contact with the top and bottom guide plates in the transport pathway once it has been passed through the first transport roller pair. On the other hand, in the image recording apparatus of the cut sheet type, the advancing ends of the sheets of light-sensitive material have to be fed into successive transport roller pairs; as the result, the light-sensitive material is transported as it is guided by the sliding contact with the guide plates and this causes a problem in that the recorded image may be damaged by the sliding contact with the guide plates. This problem occurs more or less in the light-sensitive material transporting devices located not only in the image recording apparatus of the cut sheet type but also in analog type image recording apparatus, light-sensitive material processors such as a developing device, and also in image readers such as a scanner, as far as the light-sensitive material transporting devices as described above transport the light-sensitive material. The situation is the same whether the light-sensitive material used is in the form of cut sheets, a roll or a film.

As shown in FIG. 6, the guide plate assembly 100 is usually provided with ribs (linear bumps) 102 that are arranged at specified intervals in the direction parallel to the direction in which the light-sensitive material Z is transported (or the direction normal to the plane in FIG. 6), thereby preventing the adhesion of the light-sensitive material Z to the guide plate assembly 100 due to an environmental change, especially high-temperature and high-humidity. The ribs 102 on the guide plate assembly 100 contribute to decrease the contact area between the surfaces of the light-sensitive material Z and the guide plate assembly 100 so as to prevent the adhesion of the two members even in a high-temperature and high-humidity environment where the two members are readily adhered to each other. The light-sensitive material Z is thus easily nipped by the subsequent transport roller pair, to thereby enable its smooth transport. On the other hand, the ribs 102 on the guide plate assembly 100 present a problem in that the light-sensitive material being transported makes sliding contact with the ribs 102, thus increasing the chance of its surface being damaged by the ribs.

If flaws and other forms of damage occur during the transport, images of high quality cannot be recorded and the resulting prints will have only low commercial value.

The same problem occurs not only in the guide plate assembly and the transporting device as mentioned above used to guide and transport the light-sensitive material, but also in other guide plate assemblies and image recording medium transporting devices used to guide and transport image recording media having an image forming surface, as exemplified by copy materials, ink-jet recording materials and thermal recording materials.

SUMMARY OF THE INVENTION

The present invention has been accomplished under these circumstances and has as its first object providing a guide plate that is used to guide and transport a recording medium having an image forming surface without flaw, in an image recording apparatus, an image reader and a developing device performing various image reproduction processing including exposure, recording, development and reading, whether the recording medium is supplied from the magazine in the form of a web or cut sheets, or cut to sheets of a specified length downstream of the magazine, whereupon high-quality images without flaw can be obtained through the image reproduction processing including image recording, image reading and development. There is also provided as its second object an image recording medium transporting device using the guide plate assembly.

The first object stated above can be attained by a guide plate assembly of a first aspect of the invention used to transport an image recording medium having an image forming surface and guiding at least the image forming surface of said image recording medium, wherein at least a portion of a surface of said guide plate assembly opposite to the image forming surface of said image recording medium to be guided comprises:

a matrix layer;

a cushion layer formed on the matrix layer to absorb impact due to passage of said image recording medium; and a resin layer made of a low frictional resin that is formed on the cushion layer.

In order to attain the second object, a second aspect of the invention is also provided an image recording medium transporting device to transport an image recording medium supplied from a recording medium supply section through a specified transport pathway, which comprises:

the guide plate assembly according to the first aspect; and transport means to transport said image recording medium through said transport pathway.

In the respective aspects, said guide plate assembly guides preferably the image forming surface and a back surface of said image recording medium.

Said guide plate assembly is preferably a width guide having a U-shaped cross section and which restrains an end face of said image recording medium.

Said cushion layer has preferably at least one member selected from the group consisting of glass fibers, foamed resins, rubbers and adhesives.

Said low frictional resin is preferably a fluoroplastic material, more preferably a tetrafluoroethylenic resin.

Said image recording medium is preferably supplied from the magazine in the form of a web or cut sheets, or cut to sheets of a specified length after being supplied in the form of the web.

Said image recording medium is preferably at least one material selected from the group consisting of light-sensitive materials, copy materials, ink-jet recording materials and thermal recording materials.

Said guide plate assembly has preferably a plurality of linear bumps provided parallel to a direction in which said image recording medium is transported, or a plurality of embosses.

In the above second aspect, said transport means comprises transport roller pairs to nip and transport said image recording medium.

Preferably, said transport pathway passes through an image recording section to record an image. Said image recording section is preferably a latent image forming section where a latent image is formed on said image recording medium.

Preferably, said image recording medium is a light-sensitive material and said image recording section is an exposing section where said light-sensitive material is exposed imagewise.

BRIEF DESCRIPTION OF THE DRAWINGS

FIG. 2c is a cross section of another embodiment of the image recording medium transporting device using the guide plate assembly of the invention, as shown in the same direction as in FIG. 2a;

DETAILED DESCRIPTION OF THE INVENTION

The guide plate assembly and the image recording medium transporting device using the assembly according to the present invention will now be described in detail with reference to the preferred embodiments shown in accompanying drawings.

Figure 1:
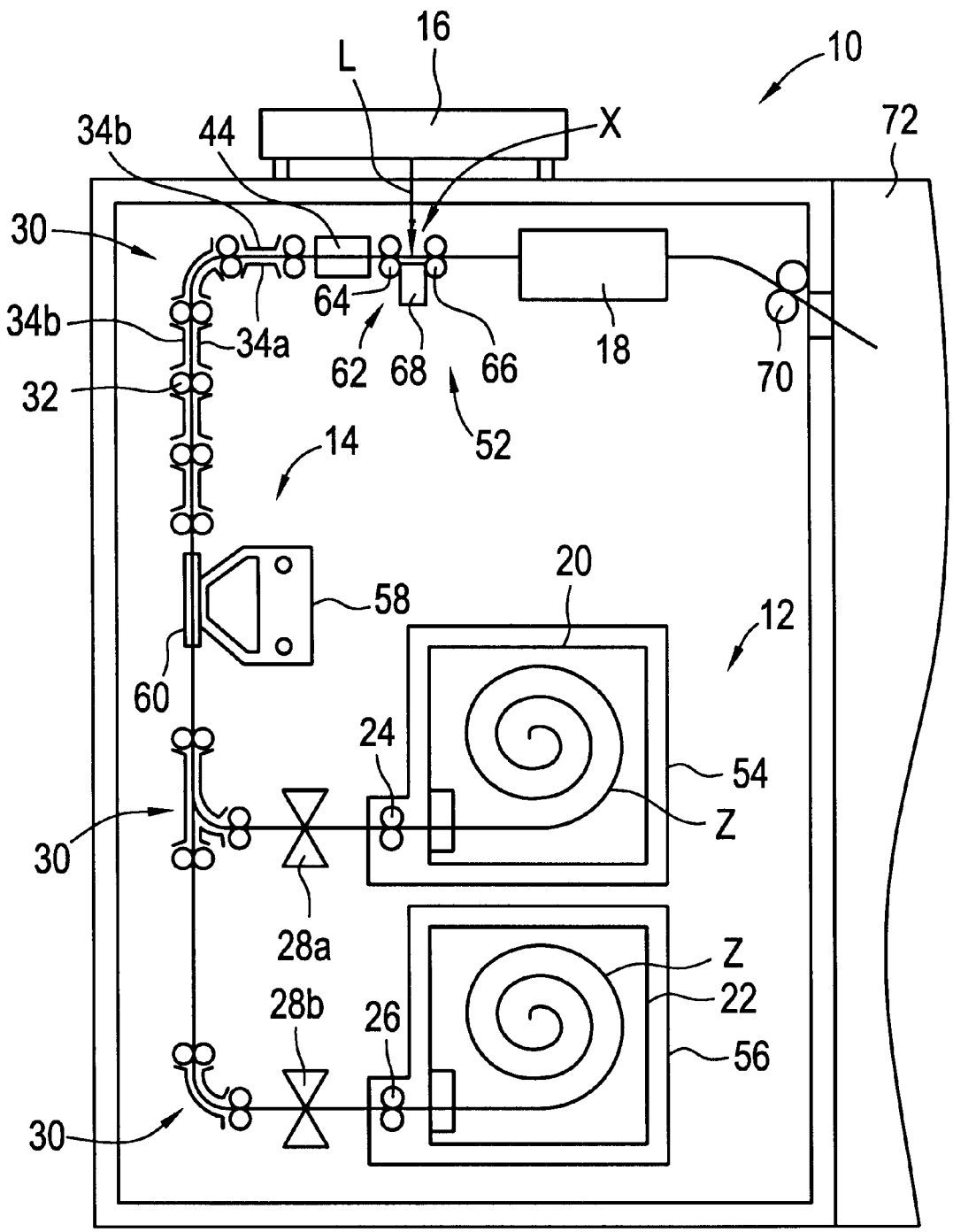
FIG. 1 shows diagrammatically an embodiment of the image recording apparatus to which the image recording medium transporting apparatus using the guide plate assembly according to the invention is applied.

FIG. 1 shows the basic composition of an embodiment of the image recording apparatus to which the image recording medium transporting device using the guide plate assembly according to the invention is applied. The image recording apparatus indicated by 10 in FIG. 1 and which is hereinafter simply referred to as the "recording apparatus" is such that a web of light-sensitive material Z is cut to individual sheets of a specified length associated with the prints to be finally produced and, after back printing (recording of a back print) and digital exposure, the exposed light-sensitive material Z is supplied into a developing device 72 (also called "processor"). To perform these functions, the recording apparatus 10 comprises a light-sensitive material supply section 12, a back printing section 14, a recording section 52 and a distributing means 18 as well as a light-sensitive material transporting device 30 to transport the light-sensitive material Z through these sections. The transporting device corresponding to the image recording medium transporting device 30 of the invention is hereinafter simply referred to as a "transporting device".

Two loaders 54 and 56 are arranged in the light-sensitive material supply section 12. The loader 54 (or 56) is a site at which a magazine 20 (or 22) containing a roll of light-sensitive material Z in a light-proof case, with the emulsion coated side (light-sensitive) facing outward, is loaded. The loader 54 (or 56) has a withdrawing roller pair 24 (or 26) in association with each outlet for the light-sensitive material. The withdrawing roller pairs 24 and 26 may be located in the magazines 20 and 22. A cutter 28a is provided downstream of and near to the withdrawing roller pair 24 whereas a cutter 28b is provided downstream of and near to the withdrawing roller pair 26.

The illustrated recording apparatus 10 can be loaded with two magazines 20 and 22 which are usually adapted to contain different types of light-sensitive material Z which are characterized by their size (width), surface gloss (silkfinish, matte and so forth), specifications (e.g., thickness and base type), and so forth, but the same type of light-sensitive material Z may be contained therein. The number of magazines that can be loaded in the recording apparatus 10 is not limited to two as in the illustrated case and it may be adapted to be capable of loading with only one magazine or three or more magazines.

The light-sensitive material Z used in the illustrated recording apparatus 10 is one for exposure with a laser beam. A specific preferred example is Fuji Color Laser Paper (LGL, LBU) available from Fuji Photo Film Co., Ltd.

In the light-sensitive material supply section 12 described above, the light-sensitive material Z is unreeled from the magazine 20 (or 22) by means of the withdrawing roller pair 24 (or 26) and transported downstream. The transport of the light-sensitive material Z stops at the point of time when it has been transported downstream from the cutter 28a (or 28b) by a length corresponding to the size of the image to be recorded. Subsequently, the cutter 28a (or 28b) turns on to cut the light-sensitive material Z to a sheet of a specified length.

The recording apparatus 10 shown in FIG. 1 has two cutters 28a and 28b in association with the two magazines 20 and 22, respectively, and webs of light-sensitive material Z unreeled from these magazines 20 and 22 are cut with the respective cutters 28a and 28b. However, this is not the sole case of the invention and the two webs may be cut with a common single cutter.

The light-sensitive material Z that has been thusly withdrawn from the light-sensitive material supply section 12 and cut to a sheet is subsequently transported by the transporting device 30 into the back printing section 14. The back printing section 14 is a site for recording a back print on the back side of the sheet of light-sensitive material Z (where no emulsion is coated). The back print consists of various pieces of information such as the date when the picture was taken, the date of printing (exposure), frame number, film identification (ID) number (code), ID number of the camera used to take the picture and ID number of the photoprinter.

Having this capability, the back printing section 14 may be a dot impact printer 58 as a contact-type marking device and records a back print on the light-sensitive material Z as it is transported through a guide 60. This is not the only method that can be used to record a back print and various other back printing methods used with known photoprinters may be employed, as exemplified by an ink-jet printer and a thermal transfer printer.

To be compatible with the recently developed Advanced Photo System, the back printing section 14 is preferably adapted to be capable of marking at least two lines at a time.

The back printing section 14 may be disposed in any position in the transport pathway of the transporting device 30 and there are no particular limitations on the position of its location. It should, however, be noted that if the back printing section 14 is disposed downstream of the distributing means 18 in the direction of transport, a plurality of back printers have to be provided. To avoid this need, the back printing section 14 is preferably disposed upstream of the distributing means 18 in the direction of transport. It is also preferred to dispose the back printing section 14 upstream of the recording section 52 in the direction of transport, because an empty space formed in the transport pathway through the light-sensitive material supply section 12, the cutters 28a and 28b, the recording section 52 and the intervening transporting device 30 can be efficiently used so that the transport pathway downstream of the recording section 52 is simplified to achieve space saving.

The light-sensitive material Z that has been thusly cut to a sheet and subjected to back printing is thereafter transported by the transporting device 30 of the invention into the recording section 52 (particularly into an auxiliary scanning transport means 62).

The recording section 52 comprises an exposing optical unit 16 (which is hereinafter referred to as "exposing unit 16") and the auxiliary scanning transport means 62. In the illustrated case, the exposing unit 16 records an image by a technique called "digital scan exposure", in which a sheet of light-sensitive material Z being transported for scanning is exposed in a recording (exposing) position X to optical beams (recording light L) that have been modulated in accordance with digital image data and that have been deflected in a main scanning direction perpendicular to the direction of scan transport by the auxiliary scanning transport means 62.

To perform such digital exposure, the exposing unit 16 may be a known optical beam scanner that is essentially composed of light sources which issue optical beams for exposing the light-sensitive material Z with red (R), green (G) and blue (B) lights, modulating means such as AOM (acoustic optical modulator) which modulates the issued light beams in accordance with digital image data, a light deflector such as a polygonal mirror which deflects the modulated light beams in the main scanning direction which is perpendicular to the auxiliary scanning direction in which the light-sensitive material Z is transported for auxiliary scanning, and an fθ (scanning) lens with which the deflected light beams are focused to form specified beam spots at a specified point in the recording position X (on the scanning line).

The exposing unit 16 is by no means limited to this known type of optical beam scanner and it may be replaced by various kinds of digital exposing means using various arrays of light-emitting devices and spatial modulating devices which extend in a direction perpendicular to said auxiliary scanning direction. A specific example is digital exposing means using a PDP (plasma display) array, an ELD (electroluminescent display) array, and an LED (light-emitting diode) array, an LCD (liquid-crystal display) array, a DMD (digital micromirror device) array, or a laser array.

The auxiliary scanning transport means 62 comprises two transport roller pairs 64 and 66 that are provided on opposite sides of the recording position X (scanning line) and an exposing transport guide 68. A sheet of the light-sensitive material Z is held in the recording position X by means of the exposing transport guide 68 as it is transported by the transport roller pairs 64 and 66 in the auxiliary scanning direction perpendicular to the main scanning direction. As already mentioned, the optical beams are deflected in the main scanning direction, so the light-sensitive material Z is subjected to two-dimensional scan exposure with the optical beams to form a latent image.

The scanning transport means to be used in the illustrated recording apparatus 10 also is not limited to any particular type and it may be exemplified by various scanning transport means that are employed in known techniques of digital scanning exposure. In addition to the above-described scanning transport means that uses two transport roller pairs provided on opposite sides of the recording position X (scanning line), preferred specific transport means include a scanning transport means using an exposing drum that transports the light-sensitive material Z as it is held in the recording position X and two nip rollers which are provided on opposite sides of the recording position X in such a way that they are held in contact with the exposing drum, a scanning transport means consisting of an endless belt and two nip rollers, as well as a scanning transport means solely composed of an endless belt.

The thus exposed light-sensitive material having a formed latent image is forwarded to the distributing means 18 which distributes individual sheets of the light-sensitive material Z sidewise in a direction perpendicular to the direction of their transport (hence, their transport through the developing device 72).

With common silver salt photographic materials which are currently used in printing photographs, development processing in the developing device (light-sensitive material processor) 72 cannot keep pace with the exposure in the recording apparatus 10 but lags behind it if the latter is performed continuously. The distributing device 18 is provided with a view to eliminating this difficulty and by distributing individual sheets of the light-sensitive material Z sidewise to form a plurality of rows that overlap in the direction of transport, the throughput of the developing device 72 can be improved (almost doubled in two rows and tripled in three rows) and the time difference between development processing and exposure is practically cancelled.

The distributing means 18 may employ various sheet distributing methods, as exemplified by the use of a turret which rotates about a shaft, and a method in which the means of transporting the light-sensitive material Z is divided into a plurality of blocks, say, three blocks and the center block is moved sidewise to distribute the sheets of the light-sensitive material Z. Another exemplary method comprises the use of a belt conveyor that carries the light-sensitive material Z and transports it downstream and a lift transport means that uses suckers or any other suitable device to hoist the light-sensitive material Z and transport it sidewise; more specifically, the light-sensitive material Z is ejected onto the belt conveyor from an upstream position, carried to a specified position, hoisted by the lift transport means and transported either sidewise or obliquely (to a downstream position).

For the sake of clarity, FIG. 1 showing the recording apparatus 10 omits a portion of the transporting device 30 of the invention to transport the light-sensitive material Z and other components. It should however be noted that not only the transport device 30 of the invention but also a sensor for detecting the light-sensitive material and any other components of a known image recording apparatus may be provided in the recording apparatus 10 as required by a specific object.

The transport device 30 of the invention constitutes the transport pathways between the adjacent sections in the light-sensitive material supply section 12, the back printing section 14, the recording section 52 and the distributing means 18 as well as the transport pathway between the distributing means 18 and the developing device 72 in the recording apparatus shown in FIG. 1. The transport device 30 comprises transport roller pairs 32 for nipping and transporting the light-sensitive material Z and a guide plate assembly 34 of the invention that consists of a lower guide 34a for guiding the light-sensitive material Z while restraining the lower side of the transport pathway (facing the back side thereof) and an upper guide 34b for guiding the light-sensitive material Z while restraining the upper side of the transport pathway (facing the emulsion-coated side or image forming surface thereof). Further, the lower guide 34a and the upper guide 34b of the guide plate assembly 34 have preferably a plurality of linear bumps provided parallel to the direction in which the light-sensitive material Z is transported.

Figure 2A:
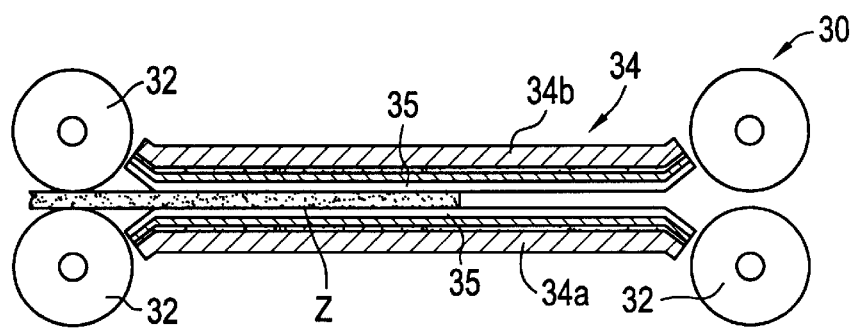
FIG. 2a is a cross section of an embodiment of the image recording medium transporting device using the guide plate assembly of the invention, as shown in the direction parallel to the direction in which the light-sensitive material is transported.
Figure 2B:
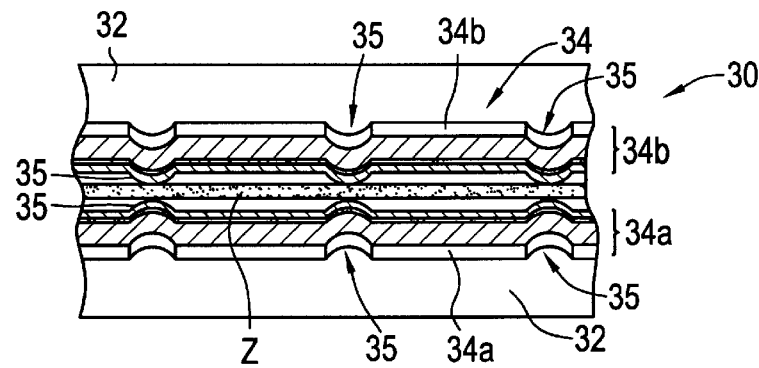
FIG. 2b is a cross section of the embodiment of FIG. 2a, as shown in the direction perpendicular to the direction of transport.
Figure 2C:
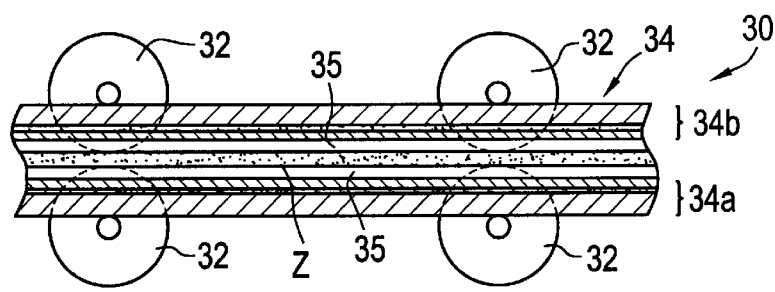
Figure 2D:
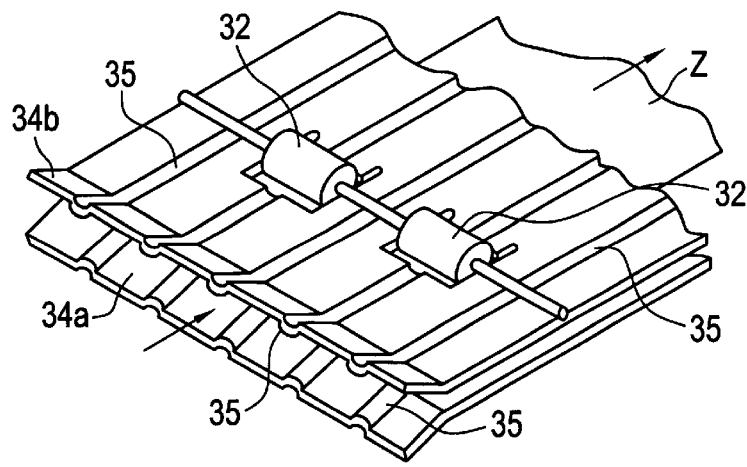
FIG. 2d is a perspective view of still another embodiment of the image recording medium transporting device using the guide plate assembly of the invention.
Figure 3:
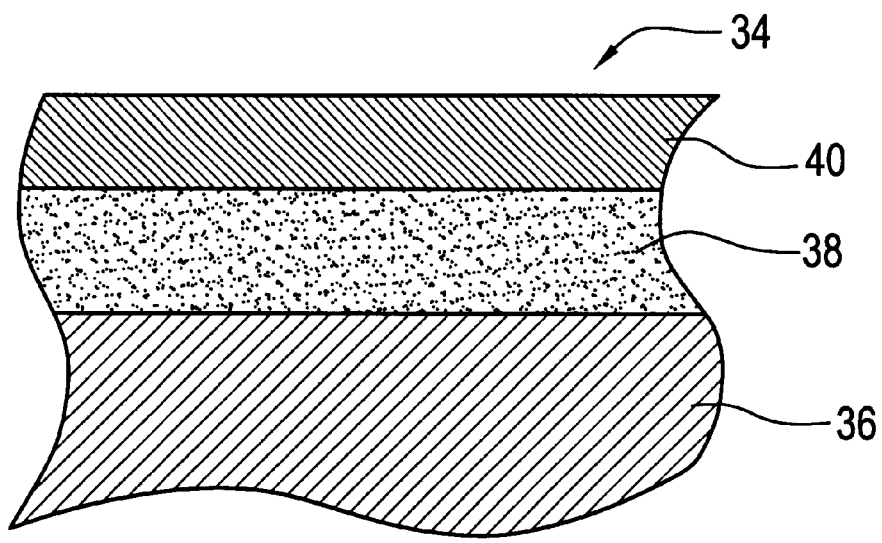
FIG. 3 is a cross section of an exemplary layer arrangement of the guide plate assembly of the invention.

In the transport device 30 of the invention, the position of the transport roller pairs 32 with respect to the guide plate assembly 34 is not limited in any particular way. As shown in FIGS. 2a and 2b, the transport roller pairs 32 may be provided on opposite ends of the guide plate assembly 34. Alternatively, as shown in FIGS. 2c and 2d, a comb-shaped guide may be used as the guide plate assembly 34 and the roller pair 32 may consist of split rollers, with the segments of each split roller being fitted in the dents of the comb-shaped guide.

The guide plate assembly 34 of the invention is not limited to the illustrated case where the assembly 34 comprises the lower guide 34a and the upper guide 34b and may have only one of these guides. It is preferred to provide at least bending portions of the transport pathway in the illustrated recording apparatus 10 with the guide plate assembly 34 having the guides 34a and 34b on each side thereof. Bumps 35 of the guide plate assembly 34 of the invention are not particularly limited in such aspects as configuration, dimension and setting position thereof, as far as the light-sensitive material Z is controlled to be guided without flaw or jamming. In case of linear form as shown in FIGS. 2a to 2d, the bumps must be provided parallel to the direction in which the light-sensitive material Z is transported. However, cylindrical or chamfered prismatic bumps or ribs may be used. Alternatively, many spherical bumps or embosses (not shown) may be used.

Depending on the need, the illustrated recording apparatus 10 may be provided as the guide plate assembly of the invention with a width guide 42 to regulate the position of the light-sensitive material Z in the direction of its width. The shape of the width guide 42 is not limited in any particular way, however, as typically shown in FIG. 4, it may have a generally U-shaped cross section turned on its side and extending in the direction of transport of the light-sensitive material Z, with the top side 42a and the lateral side 42b being formed in such a way that they are inclined outwardly at a specified angle at the receiving end where the light-sensitive material Z is entered, and with the bottom side 42c being formed in such a way that it is curved outwardly at a specified curvature at the receiving end. This arrangement is preferred since it permits smooth entry of the light-sensitive material Z.

Thus, the guide plate assembly 34 and the width guide 42 described above form part of the transport pathway to guide the light-sensitive material Z. It should also be noted that the distance between adjacent transport roller pairs 32 provided as the transport means in the transport device 30 can be set to avoid any troubles during the transport of the light-sensitive material Z. When cut sheets of the light-sensitive material Z are used as in the illustrated recording apparatus 10, the distance is set to be smaller than a minimum of the length that can be assumed by individual cut sheets.

As already mentioned, the conventional image recording apparatus of the type that performs all steps from exposure to development on a web of light-sensitive material has the advantage that once the web of light-sensitive material is passed through the first transport roller pair, it can subsequently be transported with reduced sliding contact with the upper and lower guide plates in the transport pathway. On the other hand, in the illustrated image recording apparatus of the cut sheet type, the transporting device guides sheets of the light-sensitive material Z by sliding contact with the guide plates in order that the advancing end of each sheet is fed into successive transport roller pairs but then the recorded image on the light-sensitive material Z may potentially be damaged by the sliding contact with the guide plates. Such damage is particularly prone to occur at the turn of each guide plate and when a loop is formed in the light-sensitive material.

To deal with this problem, the guide plate assembly 34 of the invention adopts a three-layer structure consisting of a matrix layer 36, a cushion layer 38 and a resin layer 40, as shown in FIGS. 2a to 2d and 3. This arrangement has been found effective in greatly reducing the flaw that would otherwise develop on the surface of the light-sensitive material Z upon sliding contact with the guide plate assembly 34, particularly with the bumps 35 and, as the result, prints of high quality can be produced by using the guide plate assembly 34 of the invention in the recording apparatus 10.

As shown specifically in FIGS. 2a to 2d and 3, the guide plate assembly 34 is comprised of the matrix layer 36 that is positioned most inwardly of the transport pathway, the cushion layer 38 on top of it, and the resin layer 40 positioned most outwardly.

The matrix layer 36 may be formed of any known materials including metals and nonmetals that define the transport pathway and which can be overlaid with the resin layer 40 via the cushion layer 38. If the matrix layer 36 is made of a metal, it may have an oxide film on the surface.

The cushion layer 38 is formed on the surface of the matrix layer 36 to absorb the impact resulting from the passage of the light-sensitive material Z. The cushion layer 38 may be formed of any known materials that can absorb impact. For providing a particularly good impact absorbing property, the cushion layer 38 is preferably adapted to have at least one member of the group consisting of glass fibers, foamed resins, rubbers and adhesives.

Various commercial glass fibers may be used without any particular limitations. Glass fibers may be used in either a monofilament or fabric form; alternatively, they may be fixed with an adhesive.

Various known foamed resins may be used without any particular limitations as long as they contain foam. Two examples are polystyrene and urethane foams.

Various known rubbers may be used without any particular limitations. Exemplary starting rubbers include natural rubbers, isoprene rubber, butadiene rubber, 1,2-polybutadiene rubber, styrene-butadiene rubber, chloroprene rubber, nitrile rubber, butyl rubber, ethylene-propylene rubber, chlorosulfonated polyethylene rubber, acrylic rubber, epichlorohydrin rubber, polysulfide synthetic rubbers, silicone rubber, fluorine-containing rubber and urethane rubber.

The cushion layer 38 may be formed of the above-described glass fibers, foamed resins, rubbers and adhesives taken either individually or in combination.

When laying up glass fibers, a foamed resin or a rubber on the matrix layer 36, an adhesive may be used to have the cushion layer 38 bonded to the matrix layer 36. If the adhesive is elastic, none of the glass fibers, foamed resin and rubber need be used but it may be used to have the resin layer 40 bonded to the matrix layer 36 so that it comprises the sole component of the cushion layer 38. In these cases, the adhesive comprises either a portion or all part of the cushion layer 38.

Various known adhesives may be used without any particular limitations as long as they provide the desired bond strength to the matrix layer 36 and the adherend. Naturally occurring adhesives include starches, dextrin, plant-derived gums, animal and vegetable proteins, asphalt, shellac, natural rubbers and sodium silicate; synthetic adhesives include thermoplastic resins such as cellulosics, alkyds, acrylic esters, polyamides, polystyrenes, synthetic rubbers and polyvinyl alcohol, as well as thermosetting resins such as urea resins, melamine resins, phenolic resins, resorcinol resins, furan resins, epoxy resins and unsaturated polyester resins.

The adhesive also is not limited to any particular types and those which are commonly used as adhesives in tapes, seals and the like will suffice. Known examples include natural rubbers containing a tackifier such as rosin, synthetic rubbers (e.g., styrene-butadiene and styrene-isoprene based), acrylic acid higher alcohol ester containing vinyl copolymers and the like that are dissolved in organic solvents, as well as aqueous emulsion based adhesives that are produced by emulsion copolymerization between acrylic monomers (e.g. butyl acrylate and 2-ethylhexyl acrylate) and other vinyl monomers. These adhesives may optionally be crosslinked or, alternatively, flocculants, plasticizers, release agents and other components may be added to the adhesives.

In either of the embodiments described above, the cushion layer 38 in the guide plate assembly 34 is effective in greatly attenuating the impact the guide plate assembly 34 will exert on the light-sensitive material Z and this effect, combined with the resin layer 40 to be described just below, contributes to significantly reduce the damage that would otherwise be caused in the light-sensitive material Z.

The resin layer 40 is formed on the surface of the cushion layer 38 to impart lubricity to the surface of the guide plate assembly 34 so that its friction coefficient is small enough to prevent the development of flaws on the light-sensitive material Z. Having this function, the resin layer 40 is formed of a low frictional material. The low frictional resin used in the resin layer 40 is not limited to any particular type, as far as the resin used contributes to impart enough lubricity to the resin layer 40 to reduce the friction coefficient between the resin layer 40 and the light-sensitive material Z, thereby preventing the development of flaws on the surface of the light-sensitive material Z. Example thereof include fluoroplastics, high-density polyolefin resins, poly(ether ether ketone) resin (PEEK), polyimide resins and polyamide resins. Various known fluoroplastics may be used without any particular limitations as long as they are thermoplastic resins containing fluorine atoms in the structural formulas of their molecules. To mention a few examples, tetrafluoroethylenic resins, chlorotrifluoroethylenic resins, vinylidene fluoride based resins, vinyl fluoride based resins and complexes of these resins may be used. Preferred examples are tetrafluoroethylenic resins.

Exemplary tetrafluoroethylenic resins include polytetrafluoroethylene (PTFE), tetrafluoroethyleneperfluoro (alkoxyethylene) copolymer (PFA), tetrafluoroethylene-hexafluoropropyleneperfluoro(alkoxyethylene) copolymer (EPE), tetrafluoroethylene-hexafluoropropylene copolymer (FEP), tetrafluoroethylene-ethylene copolymer (ETFE) and ethylene-trichlorofluoroethylene copolymer (ETCFE).

The fluoroplastic material to be used in the resin layer 40 of the invention may be a mixed system that contains one of the fluoroplastic materials described above as the main component and which additionally contains another thermoplastic resin.

As described above, the guide plate assembly 34 of the invention consists of three layers, the matrix layer 36, the cushion layer 38 and the resin layer 40. It should, however, be noted that the guide plate assembly 34 of the invention used in the illustrated image recording apparatus 10 is not limited in any particular way, as far as at least the guide that faces the emulsion coated side (image forming surface) of the light-sensitive material Z, (at least a portion of the upper guide 34b in the illustrated case) is composed of those three layers. The other portions or the other guide (lower guide 34a in the illustrated case) may be composed of one or two of the three layers including the matrix layer 36, the cushion layer 38 and the resin layer 40.

Figure 4:
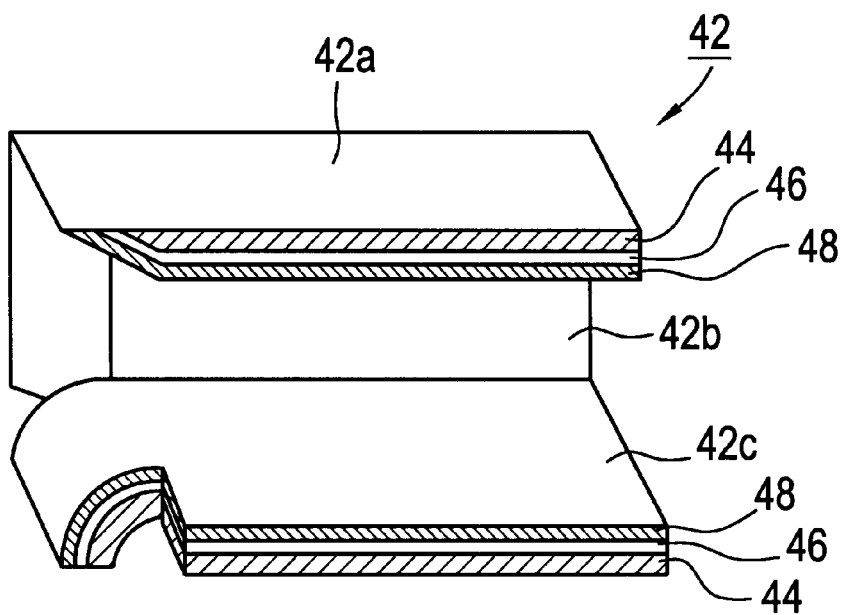
FIG. 4 is a perspective view of an embodiment of the width guide to which the guide plate assembly of the invention is applied.

This is also the case with the width guide 42 which, as shown in FIG. 4, may be composed of three layers, a matrix layer 44, a cushion layer 46 and a resin layer 48 throughout or in a portion of at least the area that faces the emulsion coated side of the light-sensitive material Z. For example, only the bend of the upper side 42a or the curved portion of the lower side 42c, or the whole of the upper and lower sides 42a and 42c in the width guide 42 shown in FIG. 4 may be composed of three layers. In this case, too, one can prevent the development of flaws due to that bend or curved portion that have positive contact with the light-sensitive material Z, or due to the upper and lower sides 42a and 42c.

If desired, a portion or the whole of the lateral side 42b of the width guide 42 may be composed of three layers and this is an effective way to prevent damaging of an end face of the light-sensitive material Z.

In order to enable the fabrication of a complex shape and to ensure sufficient strength, the matrix layer 36 of the width guide 42 is preferably made of a resin, with PC (polycarbonate) being particularly preferred.

An exemplary method of forming the cushion layer 38 and the resin layer 40 on the matrix layer 36 is described below.

If an adhesive is to be used as the constituent material of the cushion layer 38, both the cushion layer 38 and the resin layer 40 can be formed by attaching a commercial adhesive tape of a fluoroplastic material onto the matrix layer 36. In this way, the fluoroplastic material functions as the resin layer 40 and the adhesive as the cushion layer 38; hence, the main objective of the invention, i.e., preventing the development of flaws on the surface of the light-sensitive material Z, can be attained by a very simple method. In addition, this can be achieved without any modifications of the existing production equipment. A preferred example of the adhesive tape made of a fluoroplastic material is the Teflon tape available from NITTO DENKO.

If an elastic material such as glass fibers, a foamed resin or rubber is to be used as the constituent material of the cushion layer 38, the elastic material may be placed on top of the matrix layer 36 and bonded thereto either by heating or with an adhesive being interposed as already described above, whereby the cushion layer 38 is formed on the matrix layer 36. Subsequently, a thermally melted fluoroplastic material is coated on the cushion layer 38 to form the resin layer 40.

If desired, a fluoroplastic material may be directly coated onto the cushion layer 38 without heating or application of an adhesive. In this case, the adhesive strength of the fluoroplastic material ensures the cushion layer 38 to be bonded not only to the resin layer 40 but also to the matrix layer 36.

The thicknesses of the matrix layer 36, the cushion layer 38 and the resin layer 40 are not limited to any particular values. To give typical values, the matrix layer 36 is 1–1.5 mm thick. The thickness of the cushion layer 38 may be determined as appropriate for the constituent material; if it is to be made of glass fibers or a foamed resin, the thickness is typically between 0.5 and 1 mm. The resin layer 40 is preferably 10–15 μm thick.

Figure 5A:
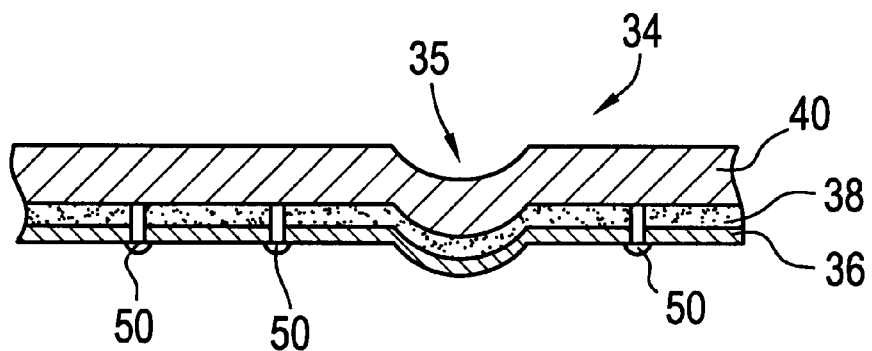
FIG. 5a is a cross section showing an emboidment of the method or means of fixing the matrix layer, the cushion layer and the resin layer in the guide plate assembly of the invention.
Figure 5B:
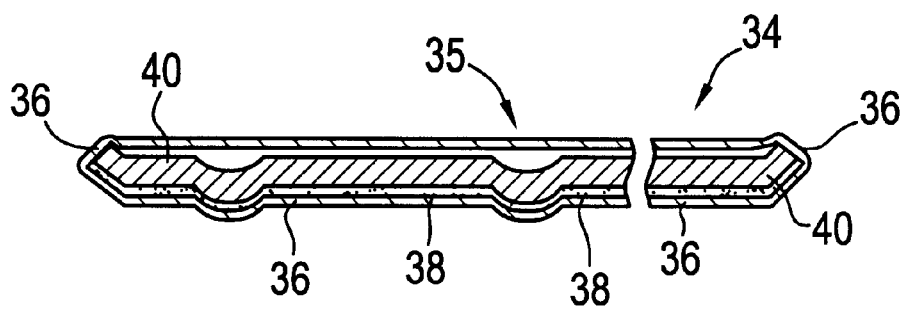
FIG. 5b is a cross section showing another fixing method or means.
Figure 6:
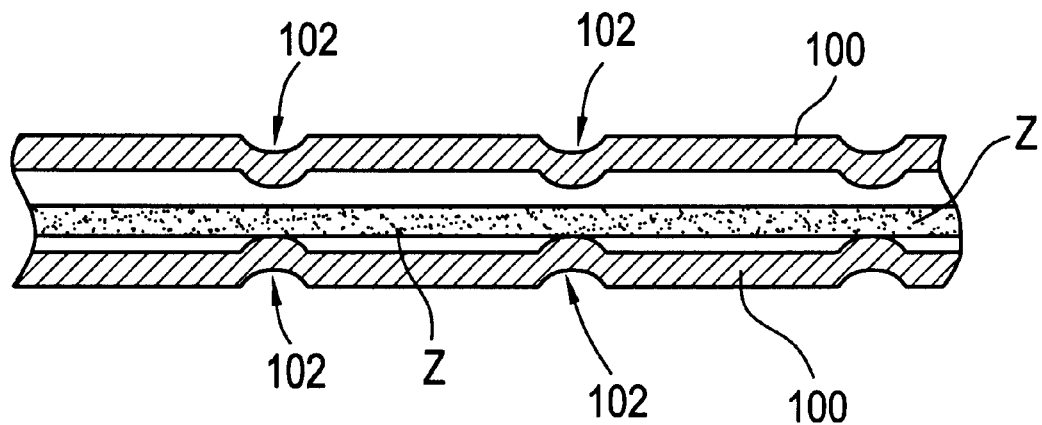
FIG. 6 is a cross section of an example of the conventional guide plate assembly.

According to the invention, the method or means of coating the matrix layer 36 with the cushion layer 38 and the resin layer 40 is not limited to the aforementioned cases, as far as the cushion layer 38 and the resin layer 40 are not separated from the matrix layer 36 and the cushion layer 38, respectively. As shown in FIG. 5a, after the matrix layer 36 is overlaid with the cushion layer 38, which in turn is overlaid with the resin layer 40, the three layers may be fixed with microrivets 50 from the side of the resin layer 40. According to another method shown in FIG. 5b, the matrix layer 36 with irregularities is first overlaid with the cushion layer 38 and the circumference of the two layers is coated with the resin layer 40. Then, the portions of the resin layer 40 located in the recess or the projection (side on which the cushion layer 38 intervenes) of the matrix layer 36 are contracted or expanded, respectively, thereby fixing the resin layer 40 to the matrix layer 36 and the cushion layer 38.

The construction of the guide plate assembly and the transport device of the invention is as described above.

In the transport device 30 constructed in the manner described above, the light-sensitive material Z is nipped and transported by the transport roller pairs 32 to travel through the pathway defined by the guide plate assembly 34 and after passing through the respective steps, the light-sensitive material Z is fed into the developing device 72.

Thus, sheets of light-sensitive material Z are distributed sidewise in a direction perpendicular to the direction of their transport to form a plurality of rows that may optionally overlap in the direction of transport; subsequently, the sheets are transported by transport roller pair 70 into the developing device 72, where they are subjected to various steps including those in a color developing tank, a bleach-fixing tank, rinse tanks as needed by the light-sensitive material Z, and thereafter dried to produce prints.

It has been found that the prints produced in the recording apparatus 10 using the transport device 30 including the illustrated guide plate assembly 34 and the width guide 42 have no surface flaws.

The guide plate assembly and the image recording medium transporting device using the assembly according to the invention were applied to an image recording apparatus in which a light-sensitive material is transported to the latent image forming section such as the exposure/recording section where image exposure is performed to form a latent image, and the embodiments were described in detail. However, the invention is not limited thereto and is also applicable to the apparatus used to guide and transport the recording media on which a color or monochromic image can be formed or was formed, such as an image recording apparatus, an image reader and a developing device, thereby performing various image reproduction processing including image exposure, latent image forming, image recording, development and image reading. The recording media applicable to the invention are also not limited to any particular type, and not only the light-sensitive materials such as photographic papers including color or monochromic papers and photographic films including color or monochromic negative and reversal films, but also color or monochromic copy materials, ink-jet recording materials and thermal recording materials can be used.

While the guide plate assembly and the image recording medium transporting device using the assembly according to the invention have been described above in detail, it should be noted that the invention is by no means limited to the foregoing cases and various improvements and modifications may of course be made without departing from the scope and spirit of the invention.

As described above in detail, according to the present invention, a recording medium having an image forming surface can be guided and transported without flaw, in an image recording apparatus, an image reader and a developing device performing various image reproduction processing including exposure, recording, development and reading, whether the recording medium is supplied from the magazine in the form of a web or cut sheets, or cut to sheets of a specified length downstream of the magazine. Consequently, high-quality images without flaw can be obtained through the image reproduction processing including image recording, image reading and development.

What is claimed is:

1. A guide plate assembly used to transport an image recording medium in slidable contact with the guide plate assembly, the image recording medium having an image forming surface, and guiding at least the image forming surface of said image recording medium, wherein at least a portion of a surface of said guide plate assembly opposite to the image forming surface of said image recording medium to be guided comprises:

a matrix layer defining a transport pathway;

a cushion layer formed on the matrix layer to absorb impact due to passage of said image recording medium; and a resin layer made of a low frictional resin that is formed on the cushion layer.

2. The guide plate assembly according to claim 1, wherein said guide plate assembly guides the image forming surface and a back surface of said image recording medium.

3. The guide plate assembly according to claim 1, wherein said guide plate assembly includes a width guide having a U-shaped cross section and which restrains an end face of said image recording medium.

4. The guide plate assembly according to claim 1, wherein said cushion layer has at least one member selected from the group consisting of glass fibers, foamed resins, rubbers and adhesives.

5. The guide plate assembly according to claim 1, wherein said low frictional resin is a fluoroplastic material.

6. The guide plate assembly according to claim 5, wherein said fluoroplastic material is a tetrafluoroethylenic resin.

7. The guide plate assembly according to claim 1, wherein said image recording medium is supplied from a magazine in the form of a web or cut sheets, or cut to sheets of a specified length after being supplied in the form of the web.

8. The guide plate assembly according to claim 1, wherein said image recording medium is at least one material selected from the group consisting of light-sensitive materials, copy materials, ink-jet recording materials and thermal recording materials.

9. The guide plate assembly according to claim 1, wherein said guide plate assembly has a plurality of linear bumps provided parallel to a direction in which said image recording medium is transported, or a plurality of embosses.

10. An image recording medium transporting device to transport an image recording medium supplied from a recording medium supply section through a specified transport pathway, which comprises:

the guide plate assembly according to claim 1; and transport means to transport said image recording medium through said transport pathway.

11. The image recording medium transporting device according to claim 10, wherein said transport means comprises transport roller pairs to nip and transport said image recording medium.

12. The image recording medium transporting device according to claim 10, wherein said transport pathway passes through an image recording section to record an image.

13. The image recording medium transporting device according to claim 12, wherein said image recording section is a latent image forming section where a latent image is formed on said image recording medium.

14. The image recording medium transporting device according to claim 12, wherein said image recording medium is a light-sensitive material and wherein said image recording section is an exposing section where said light-sensitive material is exposed imagewise.

* * * * *